US011367051B2

(12) United States Patent
Asokan et al.

(10) Patent No.: US 11,367,051 B2
(45) Date of Patent: Jun. 21, 2022

(54) SYSTEM AND METHOD FOR CONDUCTING AN AUTOMATED INTERVIEW SESSION

(71) Applicant: Genesys Telecommunications Laboratories, Inc., Daly City, CA (US)

(72) Inventors: Anantha Krishnan Asokan, Hyderabad (IN); Balaji Gokulakannan, Chennai (IN); Sabariganesh Jayaraman, Chennai (IN); Vidhyasimhan Jayaraghavendran, Chennai (IN)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 230 days.

(21) Appl. No.: 16/875,405

(22) Filed: May 15, 2020

(65) Prior Publication Data
US 2021/0312399 A1 Oct. 7, 2021

(30) Foreign Application Priority Data

Apr. 3, 2020 (IN) ............................. 202041014886

(51) Int. Cl.
*G06Q 10/10* (2012.01)
*G10L 15/22* (2006.01)
(Continued)

(52) U.S. Cl.
CPC ........ *G06Q 10/1053* (2013.01); *G10L 15/063* (2013.01); *G10L 15/1815* (2013.01);
(Continued)

(58) Field of Classification Search
CPC .............. G06Q 10/1053; G10L 15/063; G10L 15/1815; G10L 15/22; G10L 25/63; G10L 2015/223
See application file for complete search history.

(56) References Cited

U.S. PATENT DOCUMENTS 10,318,927 B2 6/2019 Champaneria
10,803,421 B1 * 10/2020 Garg ...................... G06N 5/022
(Continued)

OTHER PUBLICATIONS

International Search Report and Written Opinion of the International Searching Authority; Patent Cooperation Treaty; International Application No. PCT/US2021/018761; dated Apr. 29, 2021; 11 pages.

(Continued)

*Primary Examiner* — Michael Colucci
(74) *Attorney, Agent, or Firm* — Taft Stettinius & Hollister LLP

(57) ABSTRACT

A method for conducting an automated interview session between a candidate and an automated chat resource includes analyzing a candidate resume to identify a first personality trait; generating a first resume-based question based on the first personality trait; presenting, by the automated chat resource, the first resume-based question to the candidate during the automated interview session based on the identified first personality trait; generating a first trait score based on a first response received from the candidate, wherein the first trait score is indicative of a relevance of the identified first personality trait; generating a first question-answer score based on the first resume-based question and the first response, wherein the first question-answer score is indicative of a first question-answer relevance and is used to determine whether to present a second resume-based question to the candidate; analyzing a communication transcript to identify a second personality trait; generating a first transcript-based question based on the second personality trait; presenting, by the automated chat resource, the first transcript-based question to the candidate during the automated interview session based on the identified second personality trait; analyzing a second response from the candidate to determine whether the candidate possesses the (Continued)

identified second personality trait; generating a second trait score based on the second response in response to determining whether the candidate possesses the identified second personality trait, wherein the second trait score is indicative of a relevance of the identified second personality trait; and generating a second question-answer score based on the first transcript-based question and the second response, wherein the second question-answer score is indicative of a second question-answer relevance and is used to determine whether to present a second transcript-based question to the candidate.

20 Claims, 10 Drawing Sheets

(51) Int. Cl.
    *G10L 25/63*     (2013.01)
    *G10L 15/06*     (2013.01)
    *G10L 15/18*     (2013.01)

(52) U.S. Cl.
    CPC .............. *G10L 15/22* (2013.01); *G10L 25/63* (2013.01); *G10L 2015/223* (2013.01)

(56) References Cited

U.S. PATENT DOCUMENTS

| | | | |
|---|---|---|---|
| 11,164,136 B2 * | 11/2021 | Chee | G06Q 10/06398 |
| 2015/0324747 A1 * | 11/2015 | Corso | G06Q 10/1053 |
| | | | 705/321 |
| 2016/0232160 A1 * | 8/2016 | Buhrmann | G06Q 10/1053 |
| 2018/0150739 A1 | 5/2018 | Wu | |
| 2018/0240072 A1 | 8/2018 | Dey et al. | |
| 2019/0114593 A1 * | 4/2019 | Champaneria | G06F 16/3326 |
| 2020/0311953 A1 * | 10/2020 | Olshansky | H04N 5/222 |
| 2021/0125149 A1 * | 4/2021 | Yu | G06V 40/20 |

OTHER PUBLICATIONS

International Preliminary Report on Patentability; IPEA/US; International Application No. PCT/US2021/018761; dated Feb. 23, 2022; 28 pages.

* cited by examiner

| Agent | End User |
|---|---|
| Hello Sir. Welcome to Vodafone end user service. How can I help you today? | |
| | I really *hate* the mobile operator service and *no more interested* to continue this. I would rather shift to different operator service. What is the procedure to *cancel* my subscriptions and *terminate my account*? |
| I can understand your situation and inconvenience that you experienced. I am here to help you. Let me try to fix your problem by asking couple of questions. Can you please tell me your mobile number and location? | |
| | Hmm... Okay. It is... 9500xxxxxx and <Location>. |
| Thank you so much. I will get back to you within a minute. | |
| | Okay. |
| Thanks for your patience. We assure there is no such bad service/complaints at your exact location. Can you check your phone <with solution xxxx>? | |
| | Yes, I checked as you said. Now I'm getting services. |
| Thank you for the confirmation, sir. Am happy to serve you. And we apologize for providing any bad service if happened in the past and you can report them to us anytime, so that proper actions will be taken immediately. | |
| | Thank you for quick resolution. I will reach in case of queries and hope good services will be continued. |
| We assure to serve you better. Thank you for reaching us now. | |

FIG. 9

| Candidate | Chat Bot 208 | User Device 102 |
|---|---|---|
| | The scenario is started and assume you are Vodafone end user service agent and connected to a real end user call. Call is started now. | |
| Hi. Welcome to Vodafone end user service. What is your query? | | |
| | I really hate the mobile operator service and no more interested to continue this. I would rather shift to different operator service. What is the procedure to cancel my subscriptions and terminate my account? | |
| I can understand your situation. I can help you here. I wanted to know answers for a few of my questions. | | Positivity 60% Empathy 75% But no question is asked |
| | So what do you want me to tell you right now? | |
| Sorry I forgot to ask. I need your mobile number | | |
| | It is...9500xxxxxx | |
| Also, I need your location | | |
| | <location etc.> | |
| Actually, I noted down only 9 digit of your mobile number, Can you repeat once? | | Attentivity 20% |
| | This is frustrating. It is...9500xxxxxx | |
| Thanks for your patience. We are sorry if any bad services happened previously. We assure there is no such bad service/complaints at your exact location. Can you check you phone <with solution xxxx>? | | Empathy 80% Positivity 85% Language Fluency 90% |
| | Yes, I checked as you said. Now am getting services. | |
| Thank you for the confirmation, sir. Am happy to serve you. | | |
| | Thank you for quick resolution | |

FIG. 10

SYSTEM AND METHOD FOR CONDUCTING AN AUTOMATED INTERVIEW SESSION

CROSS-REFERENCE TO RELATED APPLICATIONS

This application claims priority to Indian Patent Application No. 202041014886 filed Apr. 3, 2020, which is incorporated by reference herein in its entirety.

BACKGROUND

The average attrition rate among agents in contact centers is estimated to be 30%, and many contact centers experience more than a 50% average attrition rate among agents. For example, in contact centers that employ thousands of agents, it is very time consuming to replace hundreds or thousands of agents annually. After a new agent position is posted, hundreds or thousands of applications are often completed by candidates to fill a particular agent position. Currently, the most common method for screening candidates is evaluating candidate resumes, which currently includes screening as many as 89% of candidates. Resume screening is one of the least effective methods for recruiting contact center agents because such a process is very time consuming and the contact center does not learn much about the candidate's skills. The remaining 11% of candidates are typically interviewed via manual methods, including, for example, face-to-face, telephone, and/or Web Real-Time Communication (i.e., voice, video, or chat) interviews. The average time required to fill a single agent position is approximately six weeks, and an average of thirty candidates are interviewed to fill a single agent position. Therefore, current screening methods for contact center agent positions are primarily conducted manually by a recruiter or a contact center input user, and the hiring statistics described above demonstrate that the current manual method of recruiting contact center agents is inefficient, expensive, and time consuming.

SUMMARY

According to an embodiment, a method for conducting an automated interview session between a candidate and an automated chat resource includes analyzing a candidate resume to identify a first personality trait; generating a first resume-based question based on the first personality trait; presenting, by the automated chat resource, the first resume-based question to the candidate during the automated interview session based on the identified first personality trait; generating a first trait score based on a first response received from the candidate, wherein the first trait score is indicative of a relevance of the identified first personality trait; generating a first question-answer score based on the first resume-based question and the first response, wherein the first question-answer score is indicative of a first question-answer relevance and is used to determine whether to present a second resume-based question to the candidate; analyzing a communication transcript to identify a second personality trait; generating a first transcript-based question based on the second personality trait; presenting, by the automated chat resource, the first transcript-based question to the candidate during the automated interview session based on the identified second personality trait; analyzing a second response from the candidate to determine whether the candidate possesses the identified second personality trait; generating a second trait score based on the second response in response to determining whether the candidate possesses the identified second personality trait, wherein the second trait score is indicative of a relevance of the identified second personality trait; and generating a second question-answer score based on the first transcript-based question and the second response, wherein the second question-answer score is indicative of a second question-answer relevance and is used to determine whether to present a second transcript-based question to the candidate.

In some embodiments, the method may further include updating a first candidate profile based on the identified first personality trait in response to identifying the first personality trait; analyzing a second candidate resume to identify at least one personality trait; updating a second candidate profile based on the identified at least one personality trait in response to identifying the at least one personality trait; and ranking the first candidate profile and the second candidate profile based on a job description profile match.

In some embodiments, the first candidate profile is ranked higher than the second candidate profile, and wherein the candidate associated with the first candidate profile is selected for the automated interview session.

In some embodiments, the method may further include identifying a third personality trait possessed by the candidate in response to analyzing at least one of the first response or the second response; and generating a third trait score based on at least one of the first response or the second response, wherein the third trait score is indicative of a relevance of the third personality trait.

In some embodiments, the method may further include generating a second transcript-based question based on the identified third personality trait; presenting, by the automated chat resource, the second transcript-based question to the candidate during the automated interview session based on the identified third personality trait; generating a fourth trait score based on a third response received from the candidate, wherein the fourth trait score is indicative of a relevance of the identified third personality trait; and generating a third question-answer score based on the second transcript-based question and the third response, wherein the third question-answer score is indicative of a third question-answer relevance and is used to determine whether to present a fourth transcript-based question to the candidate.

In some embodiments, the first personality trait comprises at least one of an attrition rate, a job history, an education history, a job skill, a hobby, or a certification.

In some embodiments, the second personality trait comprises at least one of a language fluency, a positivity, an empathy, an attentivity, an emotional stability, or a patience.

In some embodiments, the method may further include providing the first trait score, the second trait score, the first question-answer score, and the second question-answer score to a user device.

In some embodiments, the method may further include selecting the candidate for an interview session with a human based on the first trait score and the first question-answer score; presenting, by the human, a human-based question to the candidate; and receiving a human-based response from the candidate.

In some embodiments, the method may further include recording the human-based question and the human-based response; transcribing the recorded human-based question and the recorded human-based response; transmitting the transcribed human-based question and the transcribed human-based response to a user device; analyzing the transcribed human-based question and the transcribed human-based response to identify a third personality trait; and generating a third trait score based on the third personality trait.

In some embodiments, the method may further include labeling the human-based response with a different personality trait than the third personality trait in response to determining the third personality trait was incorrectly identified; modifying the third trait score in response to determining the third trait score was incorrectly generated; and training a machine learning model using the labeled human-based response and the modified third trait score.

In some embodiments, the method may further include generating a training curriculum using at least one of the first trait score, the first question-answer score, the labeled human-based response, or the modified third trait score.

In some embodiments, at least one of the first response or the second response is analyzed using a machine learning model.

According to another embodiment, a system for conducting an automated interview session between a candidate and an automated chat resource may include at least one processor; and at least one memory comprising a plurality of instructions stored thereon that, in response to execution by the at least one processor, causes the system to analyze a candidate resume to identify a first personality trait; generate a first resume-based question based on the first personality trait; present, by the automated chat resource, the first resume-based question to the candidate during the automated interview session based on the identified first personality trait; generate a first trait score based on a first response received from the candidate, wherein the first trait score is indicative of a relevance of the identified first personality trait; generate a first question-answer score based on the first resume-based question and the first response, wherein the first question-answer score is indicative of a first question-answer relevance and is used to determine whether to present a second resume-based question to the candidate; analyze a communication transcript to identify a second personality trait; generate a first transcript-based question based on the second personality trait; present, by the automated chat resource, the first transcript-based question to the candidate during the automated interview session based on the identified second personality trait; analyze a second response from the candidate to determine whether the candidate possesses the identified second personality trait; generate a second trait score based on the second response in response to determining whether the candidate possesses the identified second personality trait, wherein the second trait score is indicative of a relevance of the identified second personality trait; and generate a second question-answer score based on the first transcript-based question and the second response, wherein the second question-answer score is indicative of a second question-answer relevance and is used to determine whether to present a second transcript-based question to the candidate.

In some embodiments, the plurality of instructions further causes the system to update a first candidate profile based on the identified first personality trait in response to identifying the first personality trait; analyze a second candidate resume to identify at least one personality trait; update a second candidate profile based on the identified at least one personality trait in response to identifying the at least one personality trait; and rank the first candidate profile and the second candidate profile based on a job description profile match.

In some embodiments, the first candidate profile is ranked higher than the second candidate profile, and wherein the candidate associated with the first candidate profile is selected for the automated interview session.

In some embodiments, the first personality trait comprises at least one of an attrition rate, a job history, an education history, a job skill, a hobby, or a certification.

In some embodiments, the second personality trait comprises at least one of a language fluency, a positivity, an empathy, an attentivity, an emotional stability, or a patience In some embodiments, at least one of the first response or the second response is analyzed using a machine learning model.

According to another embodiment, one or more non-transitory machine-readable storage media comprising a plurality of instructions stored thereon that, in response to execution by at least one processor, causes the at least one processor to analyze a candidate resume to identify a first personality trait; generate a first resume-based question based on the first personality trait; present, by the automated chat resource, the first resume-based question to the candidate during the automated interview session based on the identified first personality trait; generate a first trait score based on a first response received from the candidate, wherein the first trait score is indicative of a relevance of the identified first personality trait; generate a first question-answer score based on the first resume-based question and the first response, wherein the first question-answer score is indicative of a first question-answer relevance and is used to determine whether to present a second resume-based question to the candidate; analyze a communication transcript to identify a second personality trait; generate a first transcript-based question based on the second personality trait; present, by the automated chat resource, the first transcript-based question to the candidate during the automated interview session based on the identified second personality trait; analyze a second response from the candidate to determine whether the candidate possesses the identified second personality trait; generate a second trait score based on the second response in response to determining whether the candidate possesses the identified second personality trait, wherein the second trait score is indicative of a relevance of the identified second personality trait; and generate a second question-answer score based on the first transcript-based question and the second response, wherein the second question-answer score is indicative of a second question-answer relevance and is used to determine whether to present a second transcript-based question to the candidate.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 9 is at least one embodiment of a sample transcript that may be generated using the system of FIG. 1; and FIG. 10 is at least one embodiment of a sample conversation between a chat bot and a candidate.

DETAILED DESCRIPTION

Figure 1:
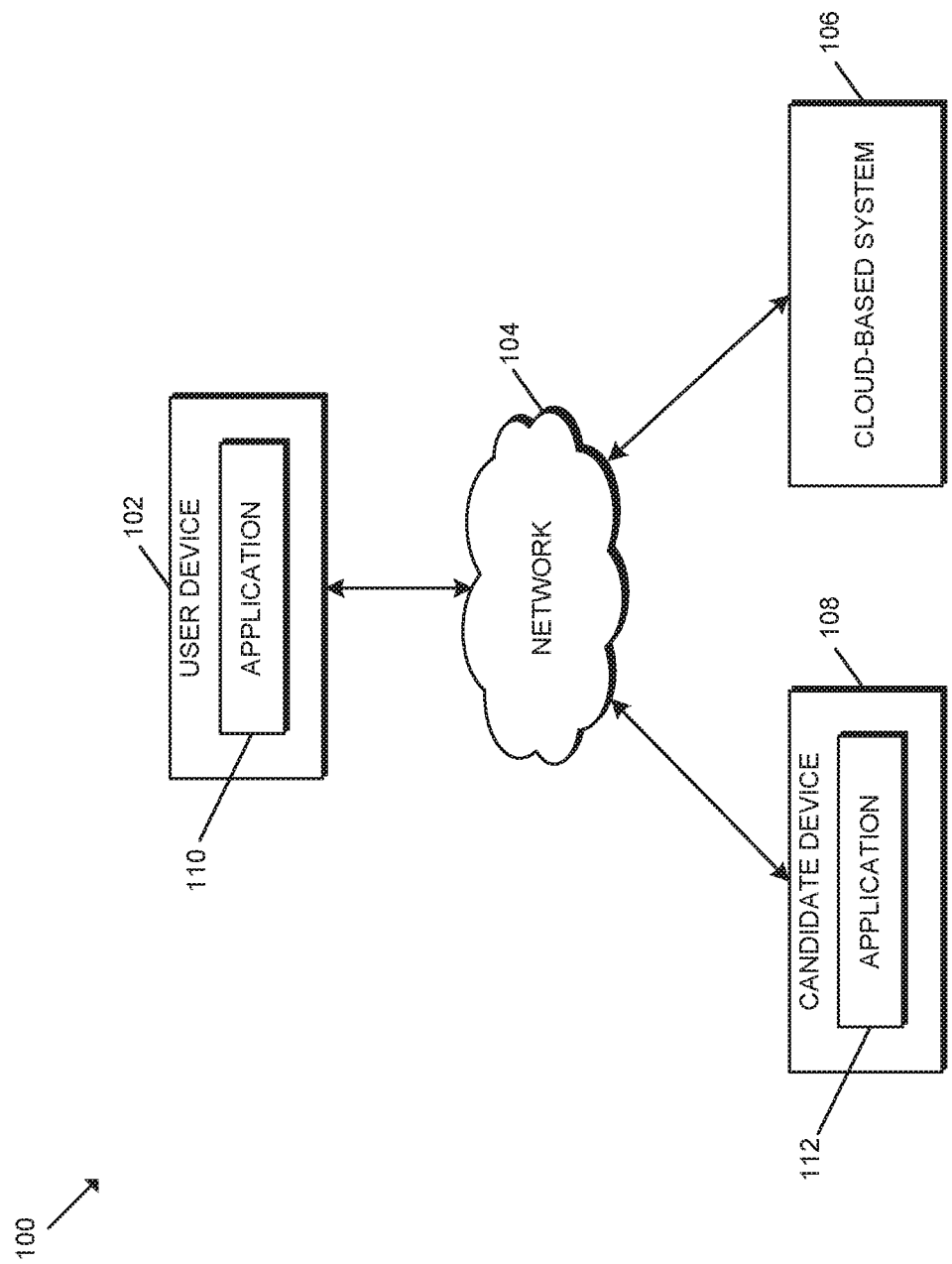
FIG. 1 is a simplified block diagram of at least one embodiment of a system for conducting an automated interview session.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for conducting an automated interview session includes a user device 102, a network 104, a cloud-based system 106, and a candidate device 108. Although only one user device 102, one network 104, one cloud-based system 106, and one candidate device 108 are shown in the illustrative embodiment of FIG. 1, the system 100 may include multiple user devices 102, networks 104, cloud-based systems 106, and/or candidate devices 108 in other embodiments. For example, in some embodiments, multiple cloud-based systems 106 (e.g., related or unrelated systems) may be used to perform the various functions described herein. Further, as described herein, multiple user devices 102 and/or candidate devices 108 may be used to access, for example, a web-based graphical user interface that permits users to manage a recruitment process and permits candidates to participate in such a recruitment process.

It should be appreciated that the system 100 and technologies described herein may include an automated recruitment system. The system 100 may allow dynamic generation of questions/scenarios from a candidate's resume and communication transcripts (e.g., contact center transcripts). The system 100 also may analyze candidate personalities and conduct automated conversational interview sessions using machine learning models and technologies. The system 100 also may predict a likelihood of attrition of a candidate. In some embodiments, the system 100 also may monitor manual interview sessions and use manual comments/feedback from an interviewer/recruiter to retrain machine learning models (e.g., AI models). Such a feedback loop (e.g., data pipelining) may refine the system 100 to learn from real-time data and conduct automated interview sessions with a "human touch" using less effort. The system 100 also may capture recruitment data and make use of a candidate's interview performance to train newly hired agents during the on-boarding process. The system 100 also may increase the speed of hiring candidates for job positions compared to a traditional recruitment system. For example, in some embodiments, the system 100 may automatically conduct screening processes for at least 1000 candidates, which may reduce the need for many manual contact center resources and reduce the length of time expended during the hiring process. The system 100 also may produce more consistent candidate interview performance results. For example, candidate interview performance results generated under traditional recruitment systems are more dependent on the mood/state of mind of the manual interviewer/recruiter, whereas the system 100 may remove those biases from the recruiting analysis. The system 100 also may reduce the attrition rate of an organization by predicting a candidate's likelihood of remaining in (or leaving) an organization over a certain period of time by analyzing the candidate's resume and previous attrition patterns. The system 100 also may assign on-board training courses to newly hired agents based on such agents' interview performance results as candidates. The system 100 also may be designed with end-to-end automation for contact center recruitment processes. Additionally, real-time recruitment results may be posted in a dashboard (e.g., GUI) where each candidate's recruitment journey may be tracked at various levels during the recruitment process.

It should be appreciated that the user device 102, network 104, cloud-based system 106, and candidate device 108 may be embodied as any type of device/system or collection of devices/systems suitable for performing the functions described herein. More specifically, in the illustrative embodiment, the user device 102 and/or the candidate device 108 may be a voice communications device, such as a telephone, a cellular phone, or a satellite phone. The user device 102 and/or the candidate device 108 alternatively may be, for example, an electronic tablet, an electronic book reader, a personal digital assistant (PDA), a portable music player, or a computer capable of communication with the cloud-based system 106. The user device 102 and/or the candidate device 108 may have various input/output devices with which a user may interact to provide and receive audio, text, video, and/or other forms of data. The user device 102 and/or the candidate device 108 may allow a user and/or a candidate to interact with the cloud-based system 106 over the network 104.

In some embodiments, the user device 102 and/or the candidate device 108 may be embodied as any type of device capable of executing an application and otherwise performing the functions described herein. For example, in the illustrative embodiment, the user device 102 may be configured to execute an application 110, and the candidate device 108 may configured to execute an application 112. It should be appreciated that each of the applications 110, 112 may be embodied as any type of application suitable for performing the functions described herein. In particular, in some embodiments, one or more of the applications 110, 112 may be embodied as a mobile application (e.g., a smartphone application), a cloud-based application, a web application, a thin-client application, and/or another type of application. For example, in some embodiments, one or more of the applications 110, 112 may serve as a client-side interface (e.g., via a web browser) for a web-based application or service. Additionally, although only one application 110, 112 is shown as being executed by the corresponding devices 102, 108, it should be appreciated that each of the devices 102, 108 may be configured to execute other applications in order to perform the functions described herein.

In some embodiments, an input user may interact with the user device 102 via a graphical user interface (GUI) of the application 110 in order to manage a recruitment process. The GUI may allow the input user to create job positions, obtain candidate resumes for open job positions from public job portals, view a ranked list of candidates, utilize filters to select candidates for initial screening or manual interviews, provide feedback from manual interviews for training machine learning models, and/or visualize the status of the recruitment process.

In some embodiments, a candidate may interact with the candidate device 108 via a GUI of the application 112 in order to participate in a recruitment process. The GUI may allow the candidate to upload a resume, select the type of manual interview session (i.e., face-to-face, telephone, and/or Web Real-Time Communication) for attending the interview process, review interview details (i.e., interview date, time, location, etc.), and/or schedule a call back option from the input user for any interview queries and/or final interview results.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices 102, 106, 108. Further, in some embodiments, one or more of the devices/systems 102, 106, 108 may not be configured to communicate with another of the devices/systems 102, 106, 108 via the network 104.

Figure 2:
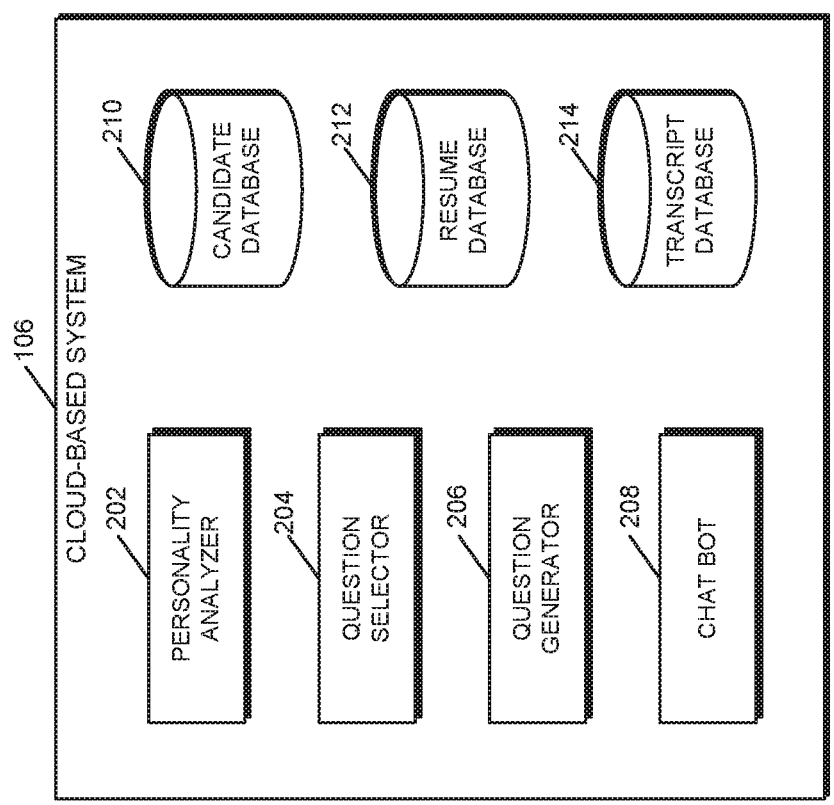
FIG. 2 is a simplified block diagram of at least one embodiment of a cloud-based system of the system of FIG. 1 for conducting an automated interview session.

Referring now to FIG. 2, the cloud-based system 106 may be embodied as any one or more types of devices/systems that are capable of performing the functions described herein. In the illustrative embodiment, the cloud-based system 106 is embodied as a cloud-based system executing in a cloud computing environment; however, it should be appreciated that, in other embodiments, the cloud-based system 106 or a portion thereof (e.g., one or more of the personality analyzer 202, the question selector 204, the question generator 206, the chat bot 208, the candidate database 210, the resume database 212, the transcript database 214, and/or one or more portions thereof) may be embodied as one or more systems executing outside of a cloud computing environment.

In cloud-based embodiments, one or more of the personality analyzer 202, the question selector 204, the question generator 206, the chat bot 208, the candidate database 210, the resume database 212, and/or the transcript database 214 (and/or one or more portions thereof) may be embodied as a server-ambiguous computing solution, for example, that executes a plurality of instructions on-demand, contains logic to execute instructions only when prompted by a particular activity/trigger, and does not consume computing resources (or consumes nominal resources) when not in use. That is, the cloud-based system 106, the personality analyzer 202, the question selector 204, the question generator 206, the chat bot 208, the candidate database 210, the resume database 212, and/or the transcript database 214 (and/or one or more portions thereof) may be embodied as a virtual computing environment residing "on" a computing system (e.g., a distributed network of devices) in which various $3^{rd}$ party virtual functions may be executed corresponding with the functions of the cloud-based system 106, the personality analyzer 202, the question selector 204, the question generator 206, the chat bot 208, the candidate database 210, the resume database 212, and/or the transcript database 214 (and/or one or more portions thereof) described herein. For example, when an event occurs (e.g., data is transferred to the cloud-based system 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made (e.g., via an appropriate user interface to the cloud-based system 106), the appropriate virtual function(s) may be executed to perform the actions before eliminating the instance of the virtual function(s).

The personality analyzer 202 may be embodied as any one or more types of devices/systems that are capable of performing the functions described herein. For example, in some embodiments, the personality analyzer 202 may be configured to analyze one or more candidate resumes to identify one or more personality traits and generate one or more trait scores. In other embodiments, the personality analyzer 202 may be configured to rank one or more candidate resumes based on the one or more personality traits identified from the candidate resume and for the job position the candidate applied for. The personality analyzer 202 may also be configured to analyze a candidate's response to a question presented to the candidate during an automated interview session to identify one or more personality traits and generate one or more trait scores. In some embodiments, the personality analyzer 202 may update a candidate profile containing the one or more personality traits for the candidate. A candidate profile may contain a list of all personality traits that the candidate may possess as identified from the candidate resume and/or a candidate's responses to a questions presented to the candidate during an automated interview session. The personality analyzer 202 may also be configured to perform natural language processing/techniques. A personality trait may also be referred to herein as a characteristic and/or skill. In other embodiments, it should be appreciated that the personality analyzer 202 may, additionally or alternatively, include other types of systems of analyzing candidate resumes and candidate responses for processing by the cloud-based system 106 and/or other devices of the system 100.

The question selector 204 may be embodied as any one or more types of devices/systems that are capable of performing the functions described herein. The question selector 204 may be configured to retrieve a personality trait from a candidate profile, which may be maintained by the personality analyzer 202, and use the personality trait as a reference to retrieve a question/scenario from the question generator 206 and present the question/scenario to a candidate during an automated interview session. The question selector 204 may also be configured to analyze a candidate's response to a question/scenario presented to the candidate during an automated interview session to generate a question-answer relevance score to determine whether to ask another question/scenario or modify the previous question/scenario presented to the candidate. The terms "question-answer relevance score" and "Q-A relevance score" are used interchangeably herein. In some embodiments, the question selector 204 may identify which part of a question/scenario was unanswered from the response. The intention of the question selector 204 identifying an unanswered portion of a question/scenario from a candidate response may be to decide whether to scrutinize the candidate more regarding the same question/scenario, because the candidate response may be irrelevant or insufficient to proceed or the candidate may require more context/specifics for the previous question. This analysis may allow the question selector 204 to dynamically decide the flow of questions similarly to manual interviews (e.g., a human interview session). In an embodiment, the question selector 204 may be trained regarding how to dynamically switch between questions/scenarios. In other embodiments, it should be appreciated that the question selector 204 may, additionally or alternatively, include other types of systems of retrieving a question/scenario and/or generating a question-answer relevance score for processing by the cloud-based system 106 and/or other devices of the system 100.

The question generator 206 may be embodied as any one or more types of devices/systems that are capable of performing the functions described herein. The question generator 206 may be configured to analyze a candidate resume to identify one or more personality traits and generate one or more questions based on the identified one or more personality traits. For example, if a candidate enumerated previous job history on a candidate resume, one or more questions may be generated by the question generator 206 to obtain an explanation from the candidate of the job history (i.e., general questions). Similarly, for example, if a candidate enumerated many job experiences on a candidate resume, one or more questions may be generated by the question generator 206 to obtain an explanation from the candidate for the multiple job experiences (i.e., attrition-based questions). The question generator 206 may also be configured to analyze a communication transcript (e.g., a contact center transcript) to identify one or more personality traits and generate one or more questions based on the identified one or more personality traits. For example, scenario-based questions may be generated by the question generator 206 as described in further detail below. The question generator 206 may also be configured to label one or more questions generated by the question generator 206 with one or more personality traits. In other embodiments, it should be appreciated that the question generator 206 may, additionally or alternatively, include other types of systems of generating questions for processing by the cloud-based system 106 and/or other devices of the system 100.

The chat bot 208 may be embodied as any automated service or system capable of using automation to engage with candidates and otherwise performing the functions described herein. For example, in some embodiments, the chat bot 208 may operate, for example, as an executable program that can be launched according to demand for the particular chat bot. In some embodiments, the chat bot 208 simulates and processes human conversation (either written or spoken), allowing humans to interact with digital devices as if the humans were communicating with another human. In some embodiments, the chat bot 208 may be as simple as rudimentary programs that answer a simple query with a single-line response, or as sophisticated as digital assistants that learn and evolve to deliver increasing levels of personalization as they gather and process information. In some embodiments, the chat bot 208 includes and/or leverages artificial intelligence, adaptive learning, bots, cognitive computing, and/or other automation technologies. In some embodiments, the chat bot 208 may leverage one or more machine learning and/or artificial intelligence techniques to determine whether to present one or more questions to a candidate and/or escalate the conversation to a human resource. For example, in some embodiments, the chat bot 208 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms. It should be appreciated that any device/system described herein may utilize one or more of these machine learning and/or artificial intelligence algorithms, techniques, and/or mechanisms.

In one embodiment, the number of chat bots 208 may vary according to the design and function of a chat automation server and is not limited to the number illustrated in FIG. 2. For example, different chat bots 208 may be created to have different profiles. The profile of a particular chat bot may be used to select a chat bot with expertise regarding a particular job position. Engaging chat bots 208 with profiles that are catered to specific job positions may allow more effective communication with candidates. For example, one chat bot may be designed or specialized to engage in a first topic of communication, while another chat bot may be designed or specialized to engage in a second topic of communication that is different from the first topic of communication. In another example, the chat bots 208 may be configured to utilize different dialects or slang, or may have different personality traits or characteristics. For example, the vocabulary of the different chat bots 208 may be tailored to use the slang or diction of young people, elderly people, people in a certain region of the country, and/or people having a certain language or ethnic background. Chat bot 208 may also be referred to herein as one or more chat robots, AI chat bots, automated chat robot, chatterbots, dialog systems, dialog engine, conversational agents, automated chat resources, and/or bots. It should be appreciated that, in some embodiments, the particular chat bot 208 in use (e.g., during a communication with a particular candidate) may be changed in the middle of the communication (e.g., in response to a particular trigger and/or condition detected in the communication).

A benefit of utilizing automated chat robots for engaging in chat conversations with candidates may be that it helps to more efficiently use valuable and costly resources like human resources, while maintaining candidate satisfaction. For example, chat robots may be invoked to initially handle chat conversations without a human candidate knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

Each of the candidate database 210, resume database 212, and/or transcript database 214 may be embodied as one or more databases, data structures, and/or data storage devices capable of storing data in the cloud-based system 106 or otherwise facilitating the storage of such data for the cloud-based system 106. For example, in some embodiments, the candidate database 210, resume database 212, and/or transcript database 214 may include one or more cloud storage buckets or data stores. In other embodiments, it should be appreciated that the candidate database 210, resume database 212, and/or transcript database 214 may, additionally or alternatively, include other types of voice data storage mechanisms that allow for dynamic scaling of the amount of data storage available to the cloud-based system 106. The candidate database 210, resume database 212, and/or transcript database 214 may also be embodied as any device or component, or collection of devices or components, capable of short-term or long-term storage of data. Although the candidate database 210, resume database 212, and/or transcript database 214 are described herein as data storages and databases, it should be appreciated that the candidate database 210, resume database 212, and/or transcript database 214 may include both a database (or other type of organized collection of data and structures) and data storage for the actual storage of the underlying data. The candidate database 210, resume database 212, and/or transcript database 214 may store various data useful for performing the functions described herein. For example, in some embodiments, the candidate database 210 may store candidate resume rankings, personality trait scores, and/or Q-A relevance scores. In other embodiments, the resume database 212 may store candidate resumes. In some embodiments, the transcript database 214 may store communication transcripts. In some embodiments, the communication transcripts are contact center interaction transcripts. In some embodiments the communication transcripts are rated with good feedback (from an input user or otherwise).

Although the personality analyzer 202, the question selector 204, and the question generator 206 are described herein primarily as separate devices/systems configured to perform their respective functions, it should be appreciated that one or more of the personality analyzer 202, the question selector 204, and/or the question generator 206 (and/or the functionality thereof) may form a portion of another of the personality analyzer 202, the question selector 204, and/or the question generator 206 in some embodiments. Further, in some embodiments, two or more of the personality analyzer 202, the question selector 204, and the question generator 206 may be included within the same device/system. Similarly, although the candidate database 210, the resume database 212, and the transcript database 214 are described herein primarily as separate databases, it should be appreciated that one or more of the candidate database 210, the resume database 212, and the transcript database 214 may form a portion of another of the candidate database 210, the resume database 212, and the transcript database 214 in some embodiments. Further, in some embodiments, two or more of the candidate database 210, the resume database 212, and the transcript database 214 may form portions of the same database.

It should be appreciated that each of the user device 102, the network 104, the cloud-based system 106, and/or the candidate device 108 may be embodied as (or include) one or more computing devices similar to the computing device 300 described below in reference to FIG. 3. For example, in the illustrative embodiment, each of the user device 102, the network 104, the cloud-based system 106, and/or the candidate device 108 may include a processing device 302 and a memory 306 having stored thereon operating logic 308 (e.g., a plurality of instructions) for execution by the processing device 302 for operation of the corresponding device.

Figure 3:
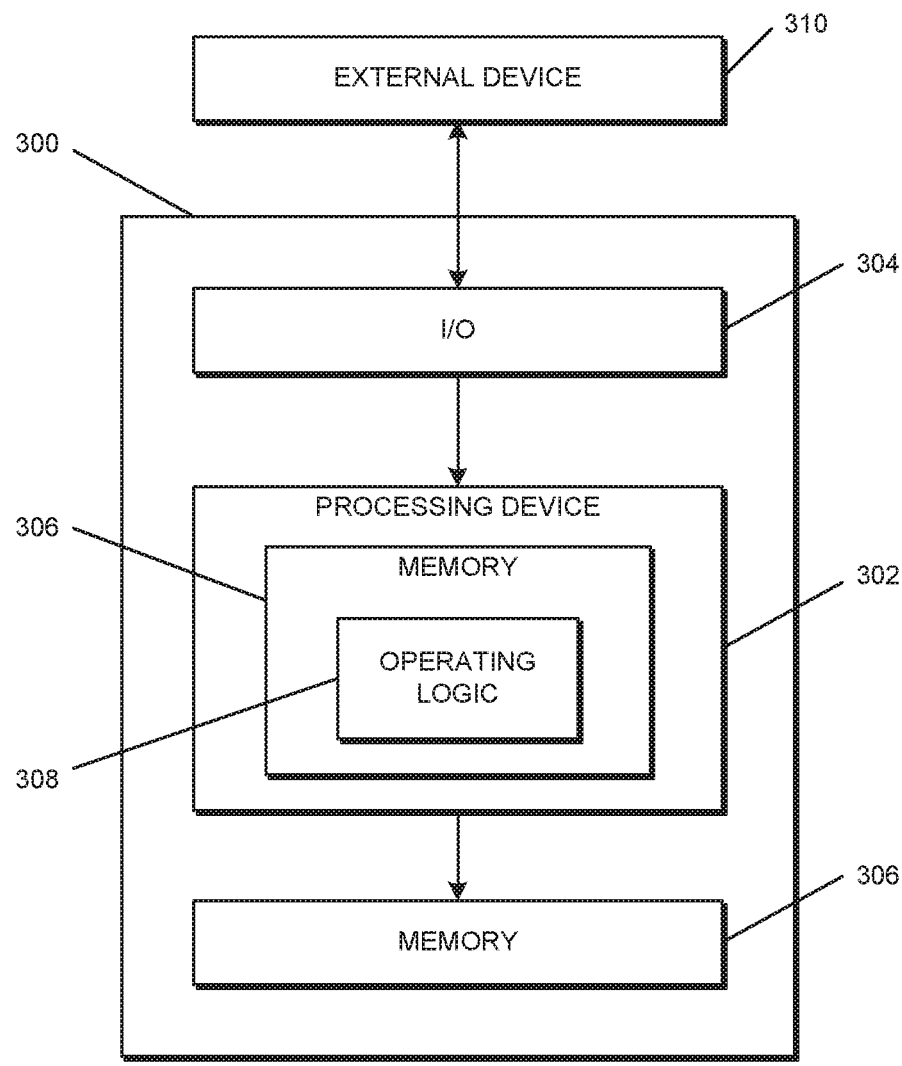
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of a user device, network, cloud-based system, and/or candidate device that may be utilized in connection with the user device 102, the network 104, the cloud-based system 106, and/or the candidate device 108 illustrated in FIG. 1. Further, in some embodiments, one or more of the personality analyzer 202, the question selector 204, the question generator 206, the chat bot 208, the candidate database 210, the resume database 212, and/or the transcript database 214 (and/or a portion thereof) may be embodied as or be executed by one or more computing devices similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the user device 102, the cloud-based system 106 (or device/system thereof), the candidate device 108, the personality analyzer 202, the question selector 204, the question generator 206, the chat bot 208, the candidate database 210, the resume database 212, and/or the transcript database 214. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
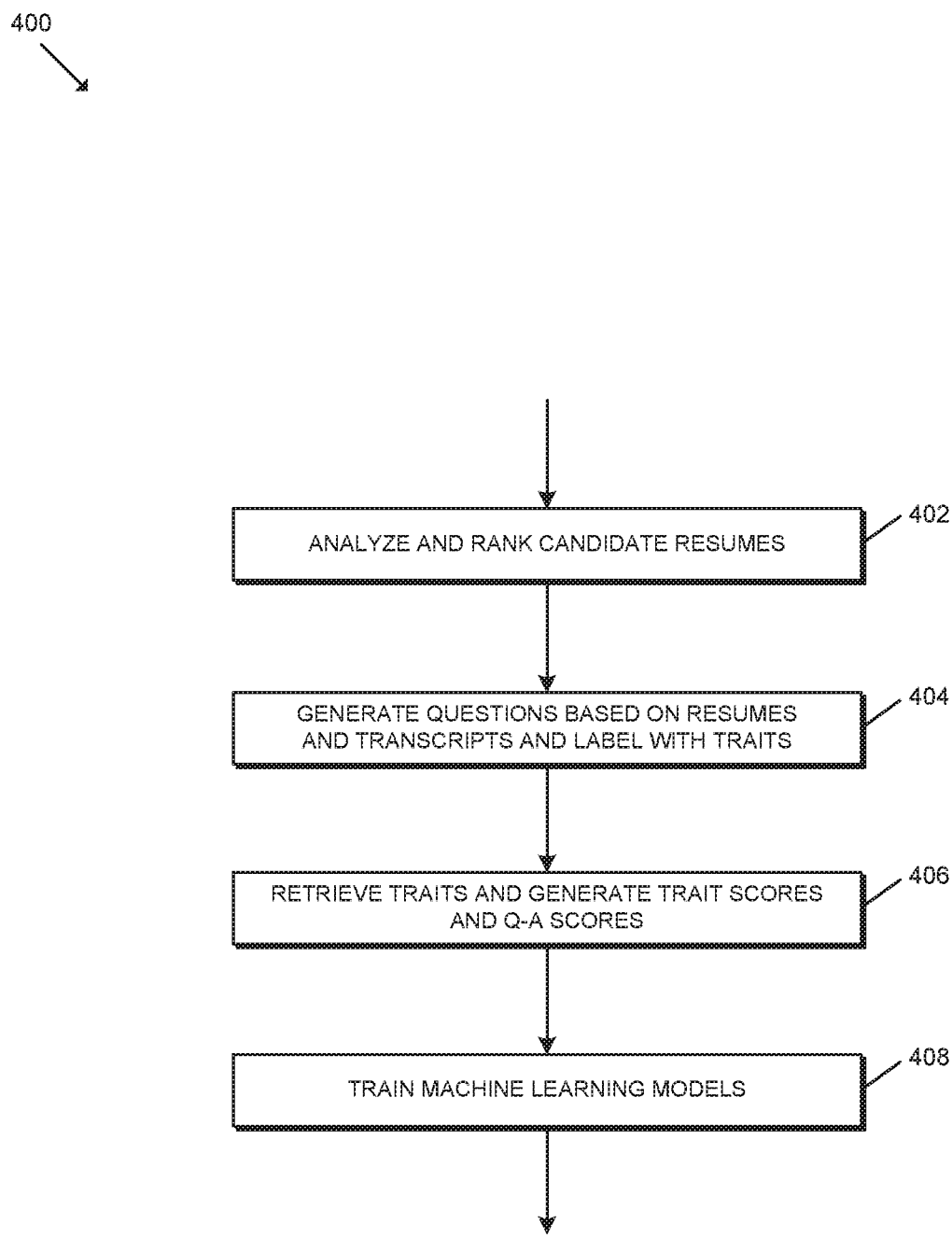
FIG. 4 is a simplified block diagram of at least one embodiment of a method for conducting an automated interview session using the system of FIG. 1.

Referring now to FIG. 4, in use, the system 100 may execute a method 400 for conducting an automated interview session and training machine learning models. It should be appreciated that the particular blocks of the method 400 are illustrated by way of example, and such blocks may be combined or divided, added or removed, and/or reordered in whole or in part depending on the particular embodiment, unless stated to the contrary. Prior to execution of the method 400, it should be appreciated that a user may interact with the user device 102 via a GUI of the application 110 in order to create one or more job positions (e.g., the system 100, via the user device 102, may receive an open job position prompt). In some embodiments, the job position may be a job position at a contact center or associated with a contact center system (e.g., contact/call center agent job position).

A contact center system may be embodied as any system capable of providing contact center services (e.g., call center services) to an end user and otherwise performing the functions described herein. Depending on the particular embodiment, it should be appreciated that a contact center system may be located on the premises of an organization utilizing a contact center system and/or located remotely relative to an organization (e.g., in a cloud-based computing environment). In some embodiments, a portion of a contact center system may be located on an organization's premises/campus while other portions of a contact center system are located remotely relative to an organization's premises/campus. As such, it should be appreciated that a contact center system may be deployed in equipment dedicated to an organization or third-party service provider thereof and/or deployed in a remote computing environment such as, for example, a private or public cloud environment with infrastructure for supporting multiple contact centers for multiple enterprises. In some embodiments, a contact center system includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

Further, in some embodiments, a candidate may interact with the candidate device 108 via a GUI of the application 112 in order to upload a candidate resume (e.g., the system 100, via the candidate device 108, may receive a candidate resume). In some embodiments, the system 100 (e.g., via a particular device/system) may retrieve one or more candidate resumes from public job portals and/or websites. In some embodiments, the cloud-based system 106 may store one or more candidate resumes in the resume database 212. In other words, in some embodiments, the illustrative method 400 executes on the presumption (and/or affirmative confirmation) that a job has been posted and one or more candidate resumes have been stored for that particular job.

The illustrative method 400 may begin with block 402 in which the system 100 (e.g., via the cloud-based system 106 or, more specifically, the personality analyzer 202) may analyze one or more candidate resumes to identify one or more personality traits and rank one or more candidate resumes based on the one or more personality traits identified from the candidate resumes and for the job position the candidate applied for. In some embodiments, to do so, the system 100 may execute the method 500 of FIG. 5 described in detail below.

In block 404, the system 100 (e.g., via the cloud-based system 106 or, more specifically, the question generator 206) may analyze a candidate resume and/or a communication transcript to identify one or more personality traits, generate one or more questions based on the identified one or more personality traits, and label the generated questions with the one or more personality traits. In some embodiments, to do so, the system 100 may execute the method 600 of FIG. 6 as described in detail below.

In block 406, the system 100 (e.g., via the cloud-based system 106) may generate a trait score and/or a Q-A relevance score based on one or more responses received from a candidate during an automated interview session. In some embodiments, to do so, the system 100 may execute the method 700 of FIG. 7 as described in detail below.

In block 408, the system 100 (e.g., via the cloud-based system 106) may train one or more machine learning models (e.g., one or more of the machine learning models used elsewhere in the method 400). In some embodiments, to do so, the system 100 may execute the method 800 of FIG. 8 as described in detail below.

Although the blocks 402-408 are described in a relatively serial manner, it should be appreciated that various blocks of the method 400 may be performed in parallel in some embodiments.

Figure 5:
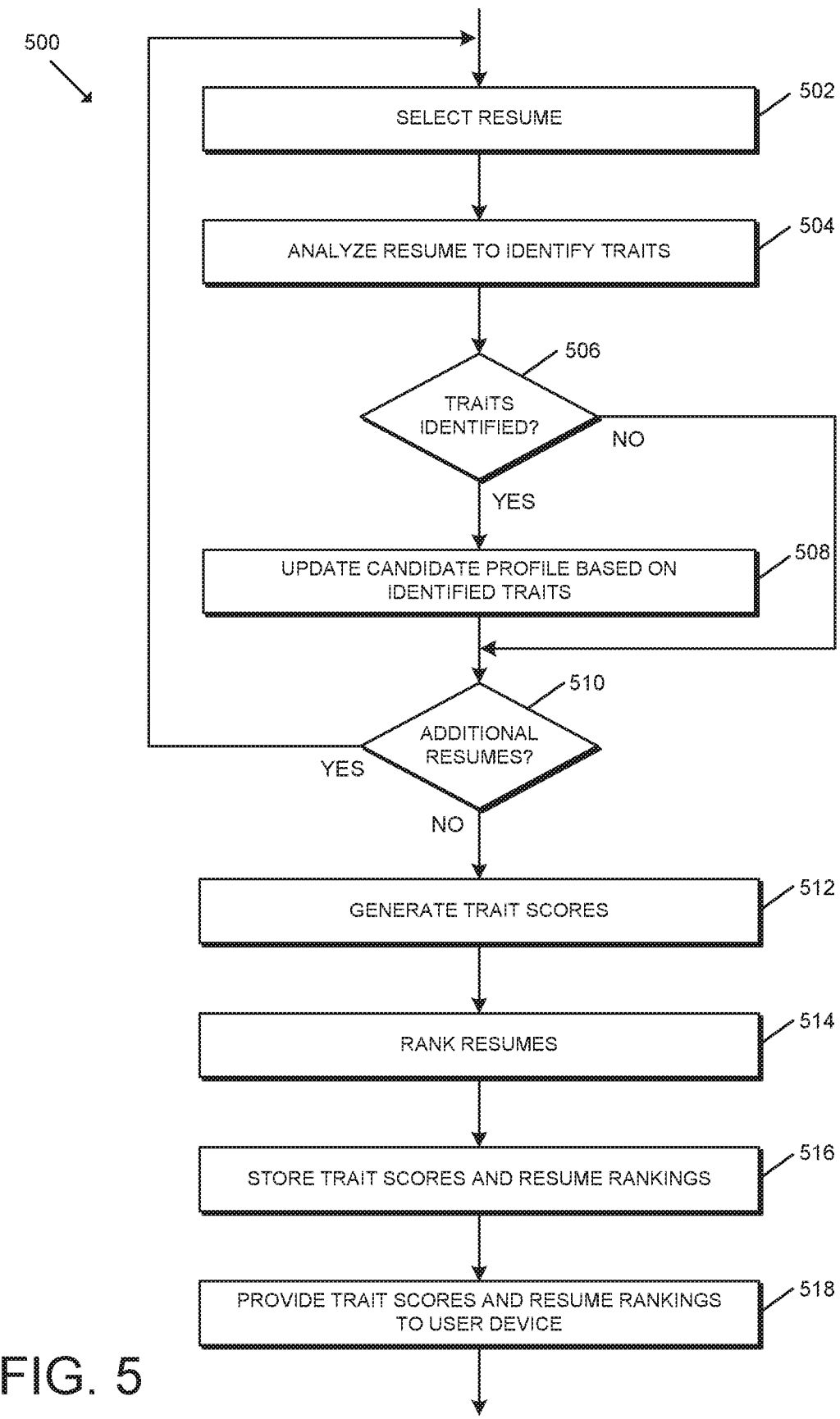
FIG. 5 is a simplified flow diagram of at least one embodiment of a method for identifying personality trait scores from candidate resumes and ranking candidate resumes using the system of FIG. 1.

Referring now to FIG. 5, in use, the system 100 may execute a method 500 for analyzing and ranking candidate resumes. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the system 100 (e.g., via the cloud-based system 106 or, more specifically, the personality analyzer 202) may select one or more candidate resumes from the resume database 212. In block 504, the personality analyzer 202 may analyze one or more candidate resumes to identify one or more personality traits that the candidate may possess. In some embodiments, a personality trait that may be identified on a candidate resume is at least one of an attrition rate, a job history, an education history, a job skill, a hobby, and a certification. In block 506, the personality analyzer 202 may determine whether any personality traits have been identified on a candidate resume. If the personality analyzer 202 determines that one or more personality traits have been identified on a candidate resume, the method 500 may advance to block 508 in which the personality analyzer 202 may update a candidate profile containing the one or more personality traits for the candidate. If the personality analyzer 202 determines, in block 506, that no personality traits have been identified from a candidate resume or in response to updating the candidate profile in block 508, the method 500 may advance to block 510 in which the personality analyzer 202 may determine whether any additional resumes are stored in the resume database 212. If the personality analyzer 202 determines that additional resumes are stored in the resume database 212, the method 500 may return to block 502 in which the personality analyzer 202 may select one or more candidate resumes from the resume database 212. However, if the personality analyzer 202 determines that no additional resumes are stored in the resume database 212, the method 500 may advance to block 512 in which the personality analyzer 202 may generate one or more trait scores. The personality analyzer 202 may update a candidate profile containing one or more personality traits for the candidate with one or more trait scores. In some embodiments, the scale for trait scores may be created based on the particular preferences of a user. For example, in some embodiments, the trait scores may be on a scale of 1 to 10 for a particular personality trait. In some embodiments, the personality analyzer 202 may update a candidate profile with an aggregate of the scores for a particular personality trait. In an embodiment, the aggregate score may equal 100%. In other embodiments, the scores for a particular personality trait may be based on a weighted scoring model based on a user's preferences. It should be appreciated that personality traits that are more important and/or relevant to a particular user may be assigned greater weights, and personality traits that are less important/relevant to a particular user may be assigned lesser weights.

In block 514, the personality analyzer 202 may rank one or more candidate resumes based on the one or more personality traits identified from the candidate resumes and for the job position the candidate applied for. The personality analyzer 202 may leverage one or more machine learning and/or artificial intelligence techniques to analyze and rank one or more candidate resumes. In some embodiments, the personality analyzer 202 may leverage a resume profile ranking model. The resume profile ranking model may be a machine learning model that is leveraged as the personality analyzer 202 scans one or more candidate resumes, matches the job description and skills required for a particular job position with the subject matter (or contents) of the one or more candidate resumes, and ranks the candidates based on particular requirements. In some embodiments, the resume scanning is specific for contact center candidate resumes. In block 516, the personality analyzer 202 may store the trait scores and/or candidate resume rankings in the candidate database 210. In block 518, the cloud-based system 106 may provide the trait scores and/or candidate resume rankings to the user device 102. An input user may interact with the user device 102 via a GUI of the application 110 in order to view the trait scores and/or candidate resume rankings.

Although the blocks 502-518 are described in a relatively serial manner, it should be appreciated that various blocks of the method 500 may be performed in parallel in some embodiments.

Figure 6:
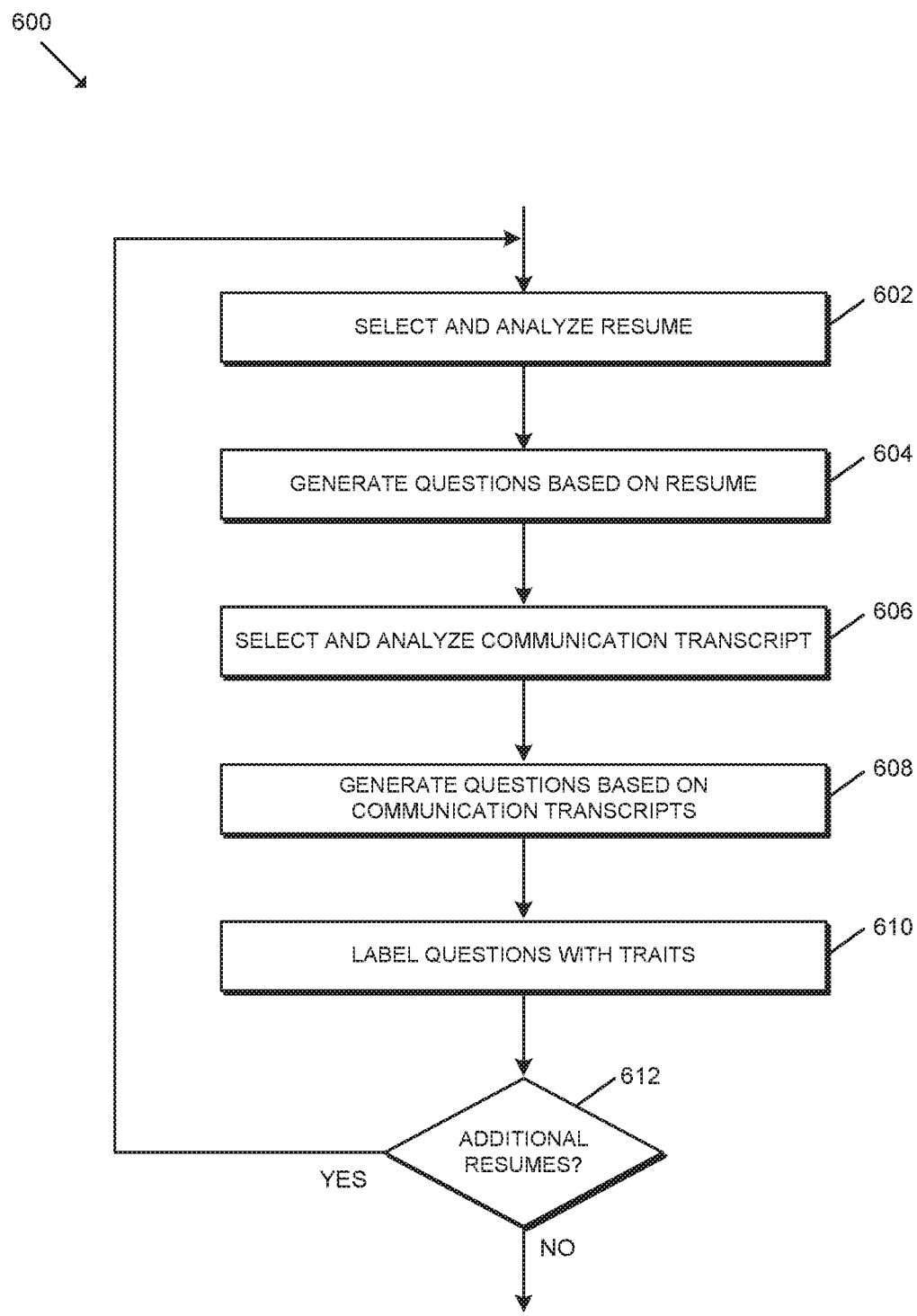
FIG. 6 is a simplified flow diagram of at least one embodiment of a method for generating questions based on identified personality traits to be presented to a candidate during an automated interview session and labeling the generated questions with personality traits using the system of FIG. 1.

Referring now to FIG. 6, in use, the system 100 may execute a method 600 for analyzing a candidate resume and/or a communication transcript to identify one or more personality traits, to generate one or more questions based on the identified one or more personality traits, and to label the generated questions with the one or more personality traits. It should be appreciated that the particular blocks of the method 600 are illustrated by way of example, and such blocks may be combined or divided, added or removed, and/or reordered in whole or in part depending on the particular embodiment, unless stated to the contrary. The illustrative method 600 begins with block 602 in which the system 100 (e.g., via the cloud-based system 106 or, more specifically, the question generator 206) may select a candidate resume from the resume database 212 and analyze the candidate resume to identify one or more personality traits that the candidate may possess. In block 604, the question generator 206 may generate one or more questions based on the one or more personality traits identified on the candidate resume. In some embodiments, the question generator 206 may generate general questions and/or attrition-based questions as described above.

The question generator 206 may leverage one or more machine learning and/or artificial intelligence techniques to generate resume-based questions. In some embodiments, the question generator 206 may leverage a resume-based questionnaire model. The resume-based questionnaire model may be leveraged by the question generator 206 to analyze the content of a candidate resume received from the resume database 212 and use prior interview performance data of one or more previous candidates for a particular job position (e.g., ex-employees, failed interview candidates, etc.) to generate general questions and attrition-based questions as described above. To achieve the generation of such questions, it should be appreciated that, in some embodiments, a machine learning model may be trained with a relevant data set to analyze the candidate resume and generate questions by text processing using machine learning techniques (e.g., for an artificial neural network and/or other machine learning algorithm/model). Additionally or alternatively, in some embodiments, the question generator 206 may generate questions to obtain an explanation from the candidate for data missing from the candidate resume or the validity of the content of the candidate resume.

In block 606, the question generator 206 may select a communication transcript from the transcript database 214 and may analyze the communication transcript to identify one or more personality traits that the candidate may possess. In some embodiments, a personality trait that may be identified on a communication transcript is at least one of a language fluency, a positivity, an empathy, an attentivity (i.e., attentiveness), an emotional stability, and a patience. It should be appreciated that a communication transcript may also be referred to herein as a contact center transcript, interaction transcript, contact center interaction transcript, and/or interactive voice response (IVR) transcript depending on the particular context and/or environment.

In block 608, the question generator 206 may generate one or more questions based on the one or more personality traits identified on the communication transcript. In some embodiments, the question generator 206 may generate scenario-based questions. In some embodiments, scenario-based questions may be a sequence/series of questions and/or answers. In other embodiments, the scenario-based questions may outline instructions/directions for asking a series of questions and/or providing a series of answers.

It should be appreciated that the question generator 206 may leverage one or more machine learning and/or artificial intelligence techniques to generate transcript-based questions. For example, in some embodiments, the question generator 206 may leverage a personality-based questionnaire model. In particular, the personality-based questionnaire model may be leveraged by the question generator 206 analyze the content of a communication transcript and generate a pair of <trait, scenario> from transcripts using text processing. The pair of <trait, scenario> may be generated by transmitting one or more communication transcripts that are rated with good feedback by input users (or otherwise) into the personality based questionnaire model, utilizing the personality based questionnaire model to analyze the intent of the communication and the emotion of an end user, and labeling the communication transcript with a personality trait identified by the question generator 206 based on such intent and emotion.

In block 610, the question generator 206 may label one or more questions generated by the question generator 206 with one or more personality traits. In some embodiments, the question generator 206 may label a question generated from a candidate resume with the label "General/Attrition," "Positivity," "Empathy," and/or another suitable tag/label. In block 612, the question generator 206 may determine whether any additional resumes are stored in the resume database 212. If the question generator 206 determines that additional resumes are stored in the resume database 212, the method 600 may return to block 602 in which the question generator 206 may select one or more additional candidate resumes from the resume database 212. If the question generator 206 determines that additional resumes are not stored in the resume database 212, however, the method 600 may terminate (e.g., such that the system 100 executes other methods described herein). In other words, in some embodiments, the method 600 may continue to execute, selecting additional candidate resumes, until no further candidate resumes are available in the resume database 212 for analysis.

Although the blocks 602-612 are described in a relatively serial manner, it should be appreciated that various blocks of the method 600 may be performed in parallel in some embodiments.

An example of a sample transcript that may be generated, according to an embodiment, by executing the method 600 (e.g., a personality based questionnaire model) is illustrated in FIG. 9. The sample transcript of FIG. 9 includes an end user/agent scenario in which the bolded phrases are examples of questions/scenarios being labeled with the personality trait empathy, and the underlined phrases are examples of questions/scenarios being labeled with the personality trait positivity. The italicized phrases are examples of questions/scenarios being labeled with emotional intent of an end user.

Figure 7:
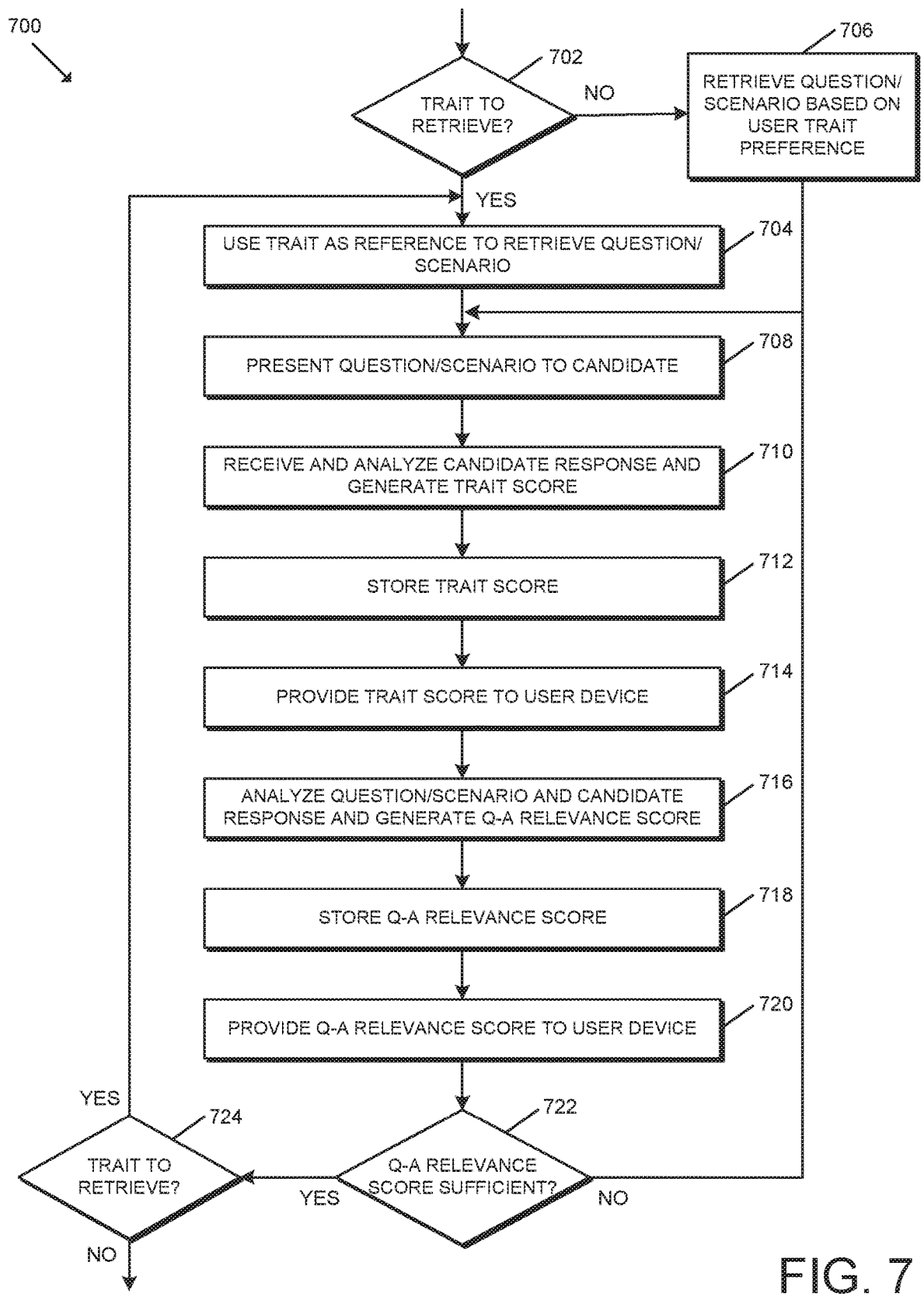
FIG. 7 is a simplified flow diagram of at least one embodiment of a method for generating trait scores and/or Q-A relevance scores based on responses received from a candidate during an automated interview session using the system of FIG. 1.

Referring now to FIG. 7, in use, the system 100 may execute a method 700 for generating a trait score and/or a Q-A relevance score based on one or more responses received from a candidate during an automated interview session. It should be appreciated that the particular blocks of the method 700 are illustrated by way of example, and such blocks may be combined or divided, added or removed, and/or reordered in whole or in part depending on the particular embodiment, unless stated to the contrary.

The illustrative method 700 begins with block 702 in which the system 100 (e.g., via the cloud-based system 106 or, more specifically, the question selector 204) may determine whether a candidate profile being maintained by the personality analyzer 202 contains one or more personality traits that may be retrieved by the question selector 204. If the question selector 204 determines that the candidate profile does contain one or more personality traits, the question selector 204 may retrieve one or more personality traits contained by the candidate profile, and the method 700 may advance to block 704 described below. If the question selector 204 determines that the candidate profile does not contain one or more personality traits that may be retrieved by the question selector 204, however, the method 700 may advance to block 706 in which the question selector 204 may retrieve a question/scenario based on a user personality trait preference, and the method 700 then advances to block 708. For example, in embodiments in which a user prefers positivity or empathy personality traits, the question selector 204 may retrieve a question/scenario labeled with positivity or empathy personality traits. In block 704, the question selector 204 may use each retrieved personality trait as a reference to retrieve one or more questions generated from a candidate resume and/or scenario-based questions generated from communication transcripts based on, for example, the labeling process described in block 610 of the method 600; such questions and/or scenarios may individually or collectively be referred to herein as a question/scenario. In block 708, the question selector 204 may provide the question/scenario to the chat bot 208. The chat bot 208 may present the question/scenario to a candidate. In some embodiments, the chat bot 208 may present the question/scenario to the candidate via audio, video, and/or chat. In block 710, the chat bot 208 may receive a response from the candidate. The chat bot 208 may provide the candidate response and the question/scenario presented to the candidate to the personality analyzer 202, which may generate a trait score based on the candidate response. The trait score may be indicative of a relevance of a personality trait. In some embodiments, one or more additional personality traits may be identified by the personality analyzer 202. In such embodiments, the personality analyzer 202 may add the identified one or more additional personality traits to the candidate profile being maintained by the personality analyzer 202.

The personality analyzer 202 may leverage one or more machine learning and/or artificial intelligence techniques to generate trait scores. The one or more machine learning and/or artificial intelligence techniques may be designed predict the relevance of a specific personality trait from the candidate response. In some embodiments, the personality analyzer 202 may leverage a supervised machine learning model that may be a trained combination of a labeled data set and an unlabeled data set. The unlabeled data set may be collected by recording manual interviews of candidates. The labeled data set may be available from open source data sets (e.g., Kaggle and other websites) and/or other relevant data sets. This model may be used to predict the relevance of personality traits from a candidate response. In some embodiments, the model may be used to predict at least one of a positivity, an empathy, an attrition rate, an emotional stability, a patience, a language fluency, and an attentivity (i.e., an attentiveness) from a candidate response. In an embodiment, the personality analyzer 202 may leverage an NLP model and/or a video emotional model. It should be appreciated that the personality analyzer 202 may determine a trait score for a particular personality trait based on the model. In block 712, the personality analyzer 202 may store the trait score in the candidate database 210. In some embodiments, the personality analyzer 202 may periodically update the stored trait score of the candidate in the candidate database 210. In block 714, the cloud-based system 106 may provide the trait score to the user device 102. A user may interact with the user device 102 via a GUI of the application 110 in order to view the trait score.

FIG. 10 illustrates a sample conversation between a chat bot 208 and a candidate. The candidate may be provided with a solution <xxx> to solve an end user issue during an automated interview session. In the example illustrated in FIG. 10, the job description for the job position is "Lead End User Service Agent role with list of skills including Good Attentivity, Language Fluency, Patience, and Positivity," and the analyzed traits from the candidate resume may be maintained in the candidate profile. The bolded phrases are examples of the personality trait empathy being identified, and the underlined phrases are examples of the personality trait positivity being identified.

In block 716, the personality analyzer 202 may provide the candidate response and the question/scenario presented to the candidate to the question selector 204. The question selector 204 may analyze the candidate's response to the question/scenario presented to the candidate to generate a Q-A relevance score to determine whether to ask another question or modify the previous question presented to the candidate. The Q-A relevance score may be indicative of a question-answer relevance. In some embodiments, if a question-answer relevance is not established, the question selector 204 may modify the previous question presented to the candidate and present the modified question to the candidate. In other embodiments, if the question selector 204 identifies that part a portion of a question/scenario may be unanswered by a candidate, the question selector 204 may present the same question/scenario in another format such that the question may be better understood by the candidate. In block 718, the question selector 204 may store the Q-A relevance score in the candidate database 210. In some embodiments, the question selector 204 may periodically update the stored Q-A relevance score in the candidate database 210.

In block 720, the cloud-based system 106 may provide the Q-A relevance score to the user device 102. A user may interact with the user device 102 via a GUI of the application 110 in order to view the Q-A relevance score. In block 722, the question selector 204 may determine whether the Q-A relevance score is sufficient. If the question selector 204 determines that the Q-A relevance score is insufficient, the method 700 may return to block 708 in which the question selector 204 may provide another question/scenario to the chat bot 208 to present the question/scenario to the candidate. If the question selector 204 determines that the Q-A relevance score is sufficient, however, the method 700 may advance to block 724 in which the question selector 204 may determine whether the candidate profile being maintained by the personality analyzer 202 contains one or more additional personality traits that may be retrieved by the question selector 204. If the question selector 204 determines that the candidate profile does contain one or more additional personality traits, the question selector 204 may retrieve one or more personality traits contained by the candidate profile, and the method 700 may return to block 704. In some embodiments, the process of presenting questions to the candidate, receiving responses from the candidate, generating trait scores, and generating Q-A relevance scores may repeat one or more times. This process may repeat until a scenario-based question retrieved from the question generator 206 for a particular personality trait is complete. If the question selector 204 determines that the candidate profile does not contain one or more additional personality traits that may be retrieved by the question selector 204, the method 700 may terminate (e.g., such that the system 100 executes other methods described herein).

Although the blocks 702-724 are described in a relatively serial manner, it should be appreciated that various blocks of the method 700 may be performed in parallel in some embodiments.

Figure 8:
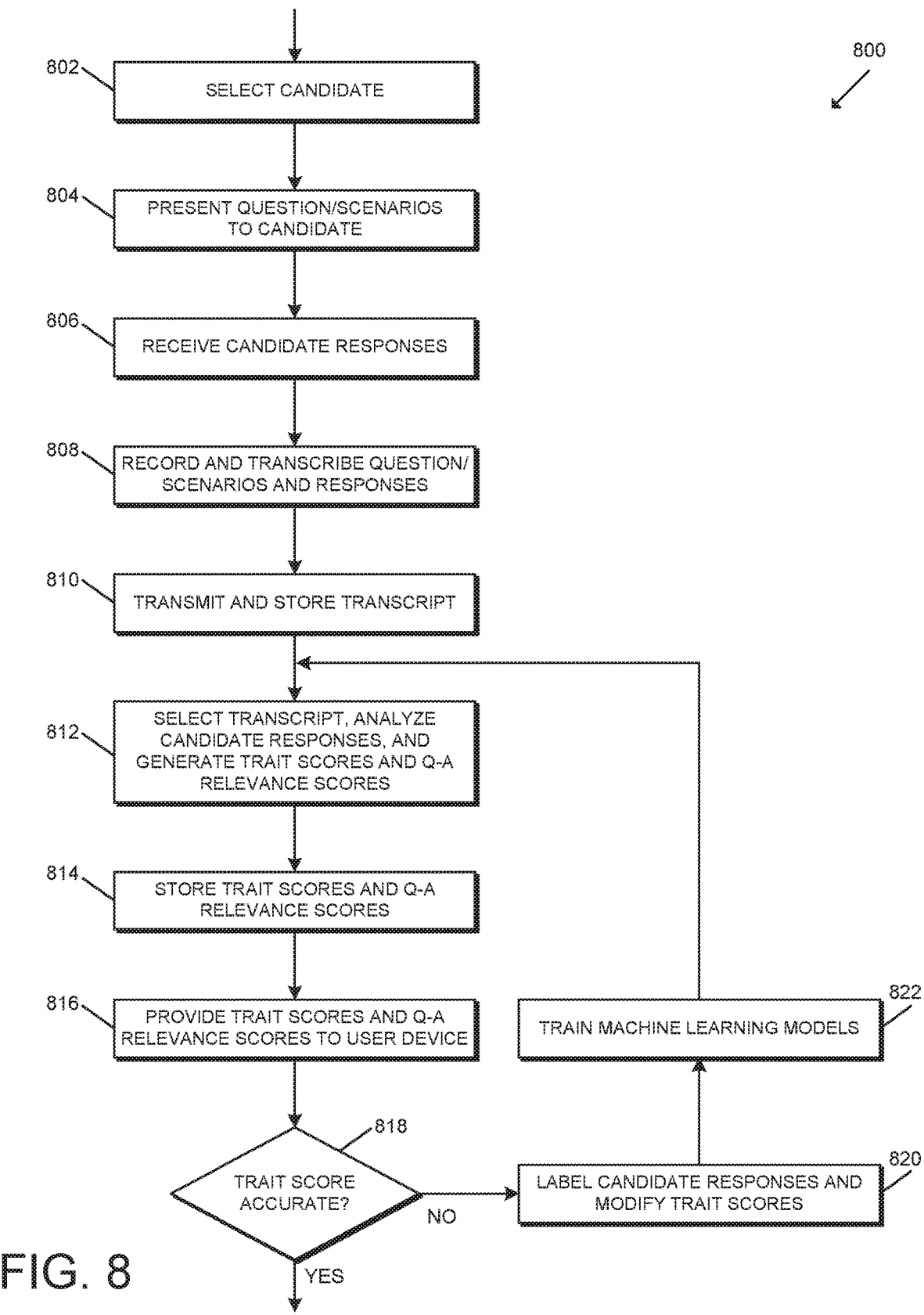
FIG. 8 is a simplified flow diagram of at least one embodiment of a method for training machine learning models using the system of FIG. 1.

Referring now to FIG. 8, in use, the system 100 may execute a method 800 for training one or more machine learning models. It should be appreciated that the particular blocks of the method 800 are illustrated by way of example, and such blocks may be combined or divided, added or removed, and/or reordered in whole or in part depending on the particular embodiment, unless stated to the contrary. The illustrative method 800 begins with block 802 in which a user may interact with the user device 102 via a GUI of the application 110 in order to select a candidate based on a particular trait score and/or Q-A relevance score. In block 804, a user may present one or more questions/scenarios to the candidate. In some embodiments, the questions/scenarios may be presented to the candidate in a manual interview session. In other embodiments, the manual interview session may be a telephonic interview session, a Web Real-Time Communication (i.e., Web-RTC) interview session, or a face-to-face interview session. Web-RTC may include voice, video, or chat communication options. In an embodiment, a user may interact with the user device 102 via a GUI of the application 110 in order to initiate a manual interview session via Web-RTC based on the user's requirements. In block 806, a user may receive one or more responses from the candidate based on the one or more questions/scenarios presented to the candidate by the user.

In block 808, the one or more questions/scenarios presented to the candidate by the user and the one or more responses received from the candidate may be recorded and transcribed (e.g., transcribed into a transcript). In block 810, the transcribed one or more questions/scenarios presented to the candidate and the transcribed one or more responses received from the candidate (e.g., transcript of questions/scenarios and responses) may be transmitted to the user device 102. The user device 102 may transmit the transcript to the system 100. The system 100 may store the transcript in a database (e.g., the candidate database 210). In block 812, the personality analyzer 202 may select the transcript, analyze the transcribed one or more responses received from the candidate, and generate one or more trait scores. The question selector 204 may select the transcript, analyze the transcribed one or more responses received from the candidate, and generate one or more Q-A relevance scores. In some embodiments in which the interview session mode is video, the system 100 (e.g., via the cloud-based system 106) may analyze one or more responses received from the candidate in the video through Web-RTC and generate trait scores and/or Q-A relevance scores. In block 814, the personality analyzer 202 may store the trait scores in the candidate database 210, and the question selector 204 may store the Q-A relevance scores in the candidate database 210. In block 816, the cloud-based system 106 may provide the trait scores and/or Q-A relevance scores to the user device 102. A user may interact with the user device 102 via a GUI of the application 110 in order to view the trait scores and/or Q-A relevance scores.

In block 818, the user may determine whether the trait scores and/or Q-A relevance scores are accurate. If the user determines that the trait scores and/or Q-A relevance scores are not accurate, the method 800 may advance to block 820 in which a user may interact with the user device 102 via a GUI of the application 110 in order to modify/correct the trait scores and/or Q-A relevance scores for each question/scenario and candidate response. A user may interact with the user device 102 via a GUI of the application 110 in order to label one or more responses from the candidate with a particular personality trait. In other embodiments, a user may interact with the user device 102 via a GUI of the application 110 in order to replace a personality trait label that the system 100 incorrectly applied to a candidate response with a different personality trait label. In block 822, a user may interact with the user device 102 via a GUI of the application 110 in order to transmit the user labeled one or more candidate responses and/or the user modified/corrected trait scores and/or Q-A relevance scores to the system 100. The system 100 may train one or more machine learning models of the system 100 using the user labeled one or more candidate responses and/or the user modified/corrected trait scores and/or Q-A relevance scores. It should be appreciated that the solution illustrated in block 822 may incorporate a supervised learning process into the method 800, which may improve the method 800 and system 100.

In some embodiments, the method 800 may return to block 812 to execute the trained one or more machine learning models of the system 100 in accordance with the analysis of candidate responses and generation of trait scores and/or Q-A relevance scores. It should be appreciated that the trained one or more machine learning models of the system 100 may also be executed by at least one of the methods 400, 500, 600, 700.

Referring back to block 818, in some embodiments, if the user determines that the trait scores and/or Q-A relevance scores are accurate, the method 800 may end or the method 800 may return to block 802 and continue executing. In some embodiments, at least one of the trait scores, Q-A relevance scores, user labeled one or more candidate responses, user modified/corrected trait scores, and user modified/corrected Q-A relevance scores may be utilized to generate a training curriculum. In some embodiments, the training curriculum may be an on-boarding training curriculum, which may be used to train newly hired agents. By using such data generated from at least one of the methods 400, 500, 600, 700, 800, a contact center or contact center system may save manual time and effort training newly hired agents and may allow such agents to be more quickly prepared to more effectively perform their job duties.

Although the blocks 802-822 are described in a relatively serial manner, it should be appreciated that various blocks of the method 800 may be performed in parallel in some embodiments.

What is claimed is:

1. A method for conducting an automated interview session between a candidate and an automated chat resource, the method comprising:

analyzing a candidate resume to identify a first personality trait;

generating a first resume-based question based on the first personality trait;

presenting, by the automated chat resource, the first resume-based question to the candidate during the automated interview session based on the identified first personality trait;

generating a first trait score based on a first response received from the candidate, wherein the first trait score is indicative of a relevance of the identified first personality trait;

generating a first question-answer score based on the first resume-based question and the first response, wherein the first question-answer score is indicative of a first question-answer relevance and is used to determine whether to present a second resume-based question to the candidate;

analyzing a communication transcript to identify a second personality trait;

generating a first transcript-based question based on the second personality trait;

presenting, by the automated chat resource, the first transcript-based question to the candidate during the automated interview session based on the identified second personality trait;

analyzing a second response from the candidate to determine whether the candidate possesses the identified second personality trait;

generating a second trait score based on the second response in response to determining whether the candidate possesses the identified second personality trait, wherein the second trait score is indicative of a relevance of the identified second personality trait; and generating a second question-answer score based on the first transcript-based question and the second response, wherein the second question-answer score is indicative of a second question-answer relevance and is used to determine whether to present a second transcript-based question to the candidate.

2. The method of claim 1, further comprising:

updating a first candidate profile based on the identified first personality trait in response to identifying the first personality trait;

analyzing a second candidate resume to identify at least one personality trait;

updating a second candidate profile based on the identified at least one personality trait in response to identifying the at least one personality trait; and ranking the first candidate profile and the second candidate profile based on a job description profile match.

3. The method of claim 2, wherein the first candidate profile is ranked higher than the second candidate profile, and wherein the candidate associated with the first candidate profile is selected for the automated interview session.

4. The method of claim 1, further comprising:

identifying a third personality trait possessed by the candidate in response to analyzing at least one of the first response or the second response; and generating a third trait score based on at least one of the first response or the second response, wherein the third trait score is indicative of a relevance of the third personality trait.

5. The method of claim 4, further comprising:

generating a second transcript-based question based on the identified third personality trait;

presenting, by the automated chat resource, the second transcript-based question to the candidate during the automated interview session based on the identified third personality trait;

generating a fourth trait score based on a third response received from the candidate, wherein the fourth trait score is indicative of a relevance of the identified third personality trait; and generating a third question-answer score based on the second transcript-based question and the third response, wherein the third question-answer score is indicative of a third question-answer relevance and is used to determine whether to present a fourth transcript-based question to the candidate.

6. The method of claim 1, wherein the first personality trait comprises at least one of an attrition rate, a job history, an education history, a job skill, a hobby, or a certification.

7. The method of claim 1, wherein the second personality trait comprises at least one of a language fluency, a positivity, an empathy, an attentivity, an emotional stability, or a patience.

8. The method of claim 1, further comprising providing the first trait score, the second trait score, the first question-answer score, and the second question-answer score to a user device.

9. The method of claim 1, further comprising:
selecting the candidate for an interview session with a human based on the first trait score and the first question-answer score;
presenting, by the human, a human-based question to the candidate; and
receiving a human-based response from the candidate.

10. The method of claim 9, further comprising:
recording the human-based question and the human-based response;
transcribing the recorded human-based question and the recorded human-based response;
transmitting the transcribed human-based question and the transcribed human-based response to a user device;
analyzing the transcribed human-based question and the transcribed human-based response to identify a third personality trait; and
generating a third trait score based on the third personality trait.

11. The method of claim 10, further comprising:
labeling the human-based response with a different personality trait than the third personality trait in response to determining the third personality trait was incorrectly identified;
modifying the third trait score in response to determining the third trait score was incorrectly generated; and
training a machine learning model using the labeled human-based response and the modified third trait score.

12. The method of claim 11, further comprising generating a training curriculum using at least one of the first trait score, the first question-answer score, the labeled human-based response, or the modified third trait score.

13. The method of claim 1, wherein at least one of the first response or the second response is analyzed using a machine learning model.

14. A system for conducting an automated interview session between a candidate and an automated chat resource, the system comprising:
at least one processor; and
at least one memory comprising a plurality of instructions stored thereon that, in response to execution by the at least one processor, causes the system to:
analyze a candidate resume to identify a first personality trait;
generate a first resume-based question based on the first personality trait;
present, by the automated chat resource, the first resume-based question to the candidate during the automated interview session based on the identified first personality trait;
generate a first trait score based on a first response received from the candidate, wherein the first trait score is indicative of a relevance of the identified first personality trait;
generate a first question-answer score based on the first resume-based question and the first response, wherein the first question-answer score is indicative of a first question-answer relevance and is used to determine whether to present a second resume-based question to the candidate;
analyze a communication transcript to identify a second personality trait;
generate a first transcript-based question based on the second personality trait;
present, by the automated chat resource, the first transcript-based question to the candidate during the automated interview session based on the identified second personality trait;
analyze a second response from the candidate to determine whether the candidate possesses the identified second personality trait;
generate a second trait score based on the second response in response to determining whether the candidate possesses the identified second personality trait, wherein the second trait score is indicative of a relevance of the identified second personality trait; and
generate a second question-answer score based on the first transcript-based question and the second response, wherein the second question-answer score is indicative of a second question-answer relevance and is used to determine whether to present a second transcript-based question to the candidate.

15. The system of claim 14, wherein the plurality of instructions further causes the system to:
update a first candidate profile based on the identified first personality trait in response to identifying the first personality trait;
analyze a second candidate resume to identify at least one personality trait;
update a second candidate profile based on the identified at least one personality trait in response to identifying the at least one personality trait; and
rank the first candidate profile and the second candidate profile based on a job description profile match.

16. The system of claim 15, wherein the first candidate profile is ranked higher than the second candidate profile, and wherein the candidate associated with the first candidate profile is selected for the automated interview session.

17. The system of claim 14, wherein the first personality trait comprises at least one of an attrition rate, a job history, an education history, a job skill, a hobby, or a certification.

18. The system of claim 14, wherein the second personality trait comprises at least one of a language fluency, a positivity, an empathy, an attentivity, an emotional stability, or a patience.

19. The system of claim 14, wherein at least one of the first response or the second response is analyzed using a machine learning model.

20. One or more non-transitory machine-readable storage media comprising a plurality of instructions stored thereon that, in response to execution by at least one processor, causes the at least one processor to:

analyze a candidate resume to identify a first personality trait;

generate a first resume-based question based on the first personality trait;

present, by the automated chat resource, the first resume-based question to the candidate during the automated interview session based on the identified first personality trait;

generate a first trait score based on a first response received from the candidate, wherein the first trait score is indicative of a relevance of the identified first personality trait;

generate a first question-answer score based on the first resume-based question and the first response, wherein the first question-answer score is indicative of a first question-answer relevance and is used to determine whether to present a second resume-based question to the candidate;

analyze a communication transcript to identify a second personality trait;

generate a first transcript-based question based on the second personality trait;

present, by the automated chat resource, the first transcript-based question to the candidate during the automated interview session based on the identified second personality trait;

analyze a second response from the candidate to determine whether the candidate possesses the identified second personality trait;

generate a second trait score based on the second response in response to determining whether the candidate possesses the identified second personality trait, wherein the second trait score is indicative of a relevance of the identified second personality trait; and generate a second question-answer score based on the first transcript-based question and the second response, wherein the second question-answer score is indicative of a second question-answer relevance and is used to determine whether to present a second transcript-based question to the candidate.

\* \* \* \* \*